(12) United States Patent
Silver et al.

(10) Patent No.: US 8,416,942 B2
(45) Date of Patent: Apr. 9, 2013

(54) METHODS, SYSTEMS, AND COMPUTER PROGRAM PRODUCTS FOR IMPLEMENTING A CUSTOM, INTERACTIVE CALL FLOW

(75) Inventors: Edward M. Silver, Decatur, GA (US); Terry Silver, legal representative, Decatur, GA (US); Nicholas S. Huslak, Duluth, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1583 days.

(21) Appl. No.: 11/674,363

(22) Filed: Feb. 13, 2007

(65) Prior Publication Data

US 2008/0192922 A1 Aug. 14, 2008

(51) Int. Cl.
*H04M 3/00* (2006.01)
*H04M 1/64* (2006.01)

(52) U.S. Cl.
USPC .................................. 379/265.01; 379/88.22

(58) Field of Classification Search ............. 379/265.01, 379/88.22; 715/762
See application file for complete search history.

(56) References Cited

U.S. PATENT DOCUMENTS

| | | | |
|---|---|---|---|
| 7,492,874 B2 * | 2/2009 | Plan ........................... | 379/88.23 |
| 2006/0253789 A1 * | 11/2006 | Cobb et al. .................... | 715/762 |
| 2007/0121855 A1 * | 5/2007 | Tiliks et al. ............. | 379/142.01 |
| 2009/0274279 A1 * | 11/2009 | Reynolds ................... | 379/88.16 |

* cited by examiner

*Primary Examiner* — Rasha Al Aubaidi
(74) *Attorney, Agent, or Firm* — Cantor Colburn LLP

(57) ABSTRACT

A method, system, and computer program product for implementing a custom, interactive call flow are provided. The method includes receiving a sequence of user inputs provided as part of an interactive call. The sequence of user inputs includes data path inputs, security inputs, administrative inputs, and a termination input. The method also includes identifying placement of the security inputs in the sequence, removing the administrative inputs and the security inputs from the sequence, and creating a custom sequence including the data path inputs, a placeholder representing the placement of the security inputs, and the termination input. The method also includes invoking a custom call flow from the custom sequence.

20 Claims, 3 Drawing Sheets

METHODS, SYSTEMS, AND COMPUTER PROGRAM PRODUCTS FOR IMPLEMENTING A CUSTOM, INTERACTIVE CALL FLOW

BACKGROUND

The present invention relates generally to interactive voice response systems, and more particularly, to methods, systems, and computer program products for implementing a custom, interactive call flow.

Interactive voice response (IVR) systems can be cumbersome to navigate, especially if the caller's goal is to speak to a human being or to get to some other specific point within a large menu tree. IVR systems enable callers to select options from a voice menu and interface with a computer processing system that provides the requested information. The system may provide pre-recorded voice prompts to which the caller enters a number or symbol on a keypad of a calling device or a vocal response that is interpreted by a text-to-speech system.

Callers who place frequent calls through an IVR system need to remember the sequence of options previously navigated or otherwise re-learn the navigational route for current calls. For IVR systems that employ large, detailed menu trees, this process can become difficult, time-consuming, and overwhelming for the caller.

What is needed, therefore, is a way to provide custom, interactive call sequences based upon previously performed navigations through an IVR menu tree.

BRIEF SUMMARY OF THE INVENTION

Exemplary embodiments include a method for implementing a custom, interactive call flow. The method includes receiving a sequence of user inputs provided as part of an interactive call. The sequence of user inputs includes data path inputs, security inputs, administrative inputs, and a termination input. The method also includes identifying placement of the security inputs in the sequence, removing the administrative inputs and the security inputs from the sequence, and creating a custom sequence including the data path inputs, a placeholder representing the placement of the security inputs, and the termination input. The method also includes invoking a custom call flow from the custom sequence.

Additional exemplary embodiments include a system for implementing a custom, interactive call flow. The system includes a host system in communication with an interactive voice response system. The host system also executes a custom call flow application. The custom call flow application, in association with the interactive voice response system, performs a method. The method includes receiving a sequence of user inputs provided as part of an interactive call. The sequence of user inputs includes data path inputs, security inputs, administrative inputs, and a termination input. The method also includes identifying placement of the security inputs in the sequence, removing the administrative inputs and the security inputs from the sequence, and creating a custom sequence including the data path inputs, a placeholder representing the placement of the security inputs, and the termination input. The method also includes invoking a custom call flow from the custom sequence.

Further exemplary embodiments include a computer program product for implementing a custom, interactive call flow. The computer program product includes instructions for causing a computer to implement a method. The method includes receiving a sequence of user inputs provided as part of an interactive call. The sequence of user inputs includes data path inputs, security inputs, administrative inputs, and a termination input. The method also includes identifying placement of the security inputs in the sequence, removing the administrative inputs and the security inputs from the sequence, and creating a custom sequence including the data path inputs, a placeholder representing the placement of the security inputs, and the termination input. The method also includes invoking a custom call flow from the custom sequence.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

Figure 1:
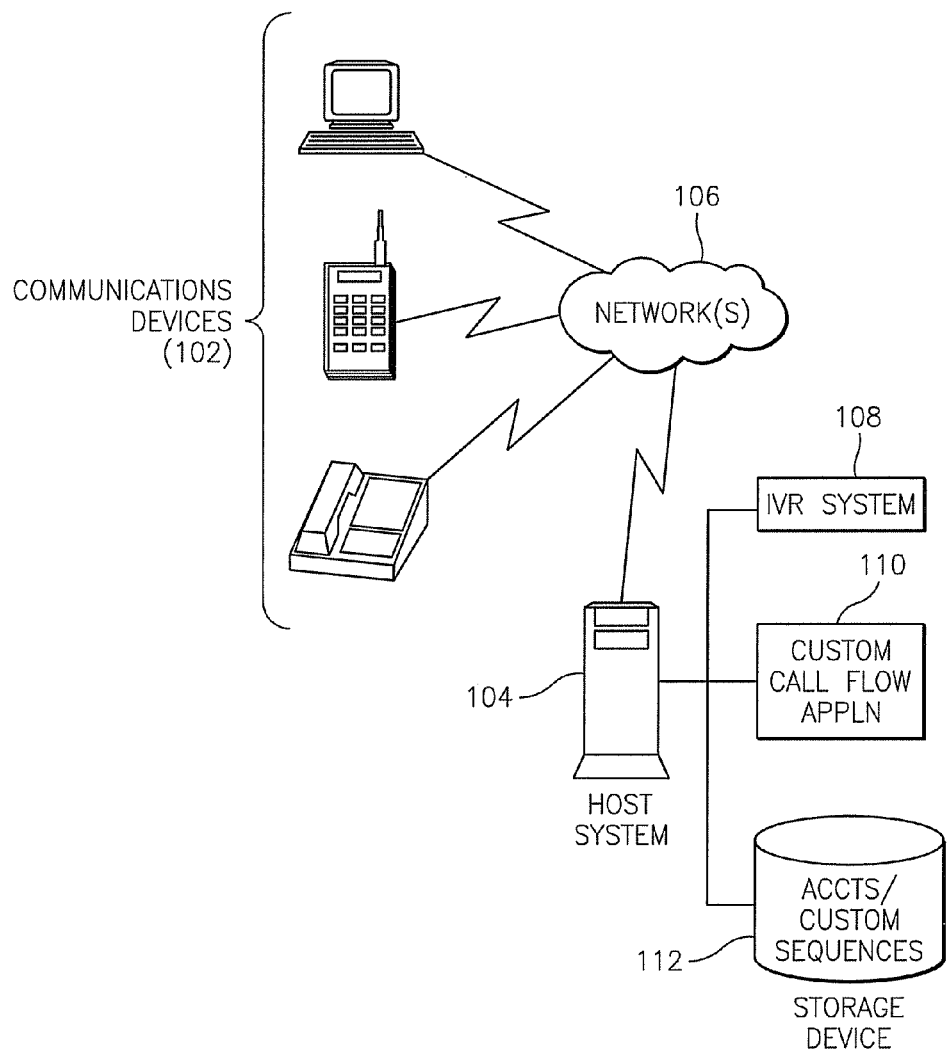
FIG. 1 is a block diagram depicting a system upon which custom, interactive call flow services may be implemented in accordance with exemplary embodiments.

The detailed description explains the exemplary embodiments, together with advantages and features, by way of example with reference to the drawings.

DETAILED DESCRIPTION OF EXEMPLARY EMBODIMENTS

Interactive voice response system services including custom, interactive call flow are provided in accordance with exemplary embodiments. The services provide a way for individuals to traverse a menu tree of the interactive voice response (IVR) system and save a successfully traversed path as a custom call sequence. The services also enable individuals to aggregate two or more custom call sequences into a single aggregate custom sequence.

Tuning now to FIG. 1, a system upon which the custom, interactive call flow services may be implemented will now be described in accordance with exemplary embodiments. The system of FIG. 1 includes communications devices 102 in communication with a host system 104 over one or more networks 106.

Communications devices 102 may include wireline telephones that communicate over a circuit-switched (e.g., standard public switched telephone network (PSTN)). Communications devices 102 may further, or alternatively, include standard wireline telephone utilizing Internet telephony technology, such as an Internet telephony service provider service along with a unique code that is entered into the device 102 prior to entering the telephone number to be called. With the advent of gateway servers and Voice over the Internet (VoIP) protocols, communications devices 102 may initiate a telephone call that is processed and transmitted over a combination of networks, e.g., circuit-switched and packet-switched networks.

Alternatively, or in addition thereto, communications devices 102 may include wireless or wireline computer devices such as a personal computer or laptop. With the proper tools (e.g., an Internet service subscription and modem, voice communications software, a microphone, sound card, and receiver), communications device 102 may implement voice communications over a packet-switched network. The computer may be a personal computer (e.g., desktop, laptop) that communicates over a network using an Internet service provider (ISP). Communications device 102 may also communicate over the Internet utilizing, e.g., digital subscriber line (DSL), cable, dial-up, wireless communications protocols (Bluetooth, WAP, etc.), and/or other known networking technologies.

Alternatively, or in addition thereto, communications devices 102 may include a personal digital assistant (PDA) or similar wireless mobile computer-processing device, and/or wireless mobile telephones. Under a subscription agreement with a wireless service provider, communications devices 102 may communicate over one or more networks (e.g., satellite, radio, cellular), as well as those depicted in the system of FIG. 1.

According to exemplary embodiments, host system 104 executes computer instructions for performing custom call flow services. The system depicted in FIG. 1 includes one or more communications devices 102 through which users at one or more geographic locations may contact the host system 104. The communications devices 102 may be coupled to the host system 104 via one or more networks 106.

Host system 104 may be implemented using one or more servers operating in response to a computer program stored in a storage medium accessible by the server. The host system 104 may operate as a network server (e.g., a web server) to communicate with the communications devices 102. The host system 104 handles sending and receiving information to and from the communications devices 102 and can perform associated tasks. The host system 104 may also include a firewall to prevent unauthorized access to the host system 104 and enforce any limitations on authorized access.

The host system 104 may also operate as an application server. According to exemplary embodiments, the host system 104 executes one or more computer programs to implement the custom call flow services. These one or more computer programs include an interactive voice response (IVR) system 108 and a custom call flow application 110. IVR system 108 may be implemented as an application that provides selectable options (e.g., voice prompts) from a voice menu for communicating with an information system, such as host system 104. IVR system 108 may implement natural language speech recognition for interpreting questions from a caller via communications devices 102. Alternatively, a guided speech IVR may be implemented that integrates human agents (e.g., at the host system 104) into the workflow of the IVR system 108 for assisting with speech recognition and related matters. Alternatively, other technologies, such as text-to-speech (TTS) engines may be used by the host system 104.

Processing of the custom call flow services may be shared by the communications devices 102 and the host system 104 by providing an application (e.g., java applet) to the communications devices 102. Alternatively, the communications devices 102 may include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

The host system 104 may be in communication with a storage device 112. Storage device 112 includes a data repository with data relating to managing the custom call flow services and may be implemented using a variety of devices for storing electronic information. It is understood that the storage device 112 may be implemented using memory contained in the host system 104, or the storage device may be a separate physical device. The storage device 112 is logically addressable as a consolidated data source across a distributed environment that includes networks 106. Information stored in the storage device 112 may be retrieved and manipulated via the host system 104 and/or via the communications devices 102. The data repository includes one or more databases containing, e.g., custom account records, and custom sequences. In addition, storage device 112 may store databases of information requested by one or more callers of communications devices 102. For example, if host system 104 represents a banking institution, storage device 112 may store account information including banking transactions and account balances, among other types of information.

While a single host system 104 is shown and described in the system of FIG. 1 for ease of illustration, it will be understood that multiple host systems or servers may be used to implement the embodiments of the invention. For example, the custom call flow application 110 may be implemented from one host system, while the IVR system 108 may reside on another host system.

Networks 106 may include any type of network including, but not limited to, a wide area network (WAN), a local area network (LAN), a global network (e.g. Internet), a virtual private network (VPN), and an intranet. The networks 106 may be implemented using a wireless network or any kind of physical network implementation known in the art.

In exemplary embodiments, the communications devices 102, host system 104 and networks 106 support dual-tone multi-frequency (DTMF) signaling or other multi-frequency shift keying (MFSK) system. Network entities (e.g., a service provider) may include encoders/decoders for converting standard pulse signals received from communications devices 102 into DTMF tones for subsequent transmission to a remote network entity (e.g., host system 104).

Figure 2:
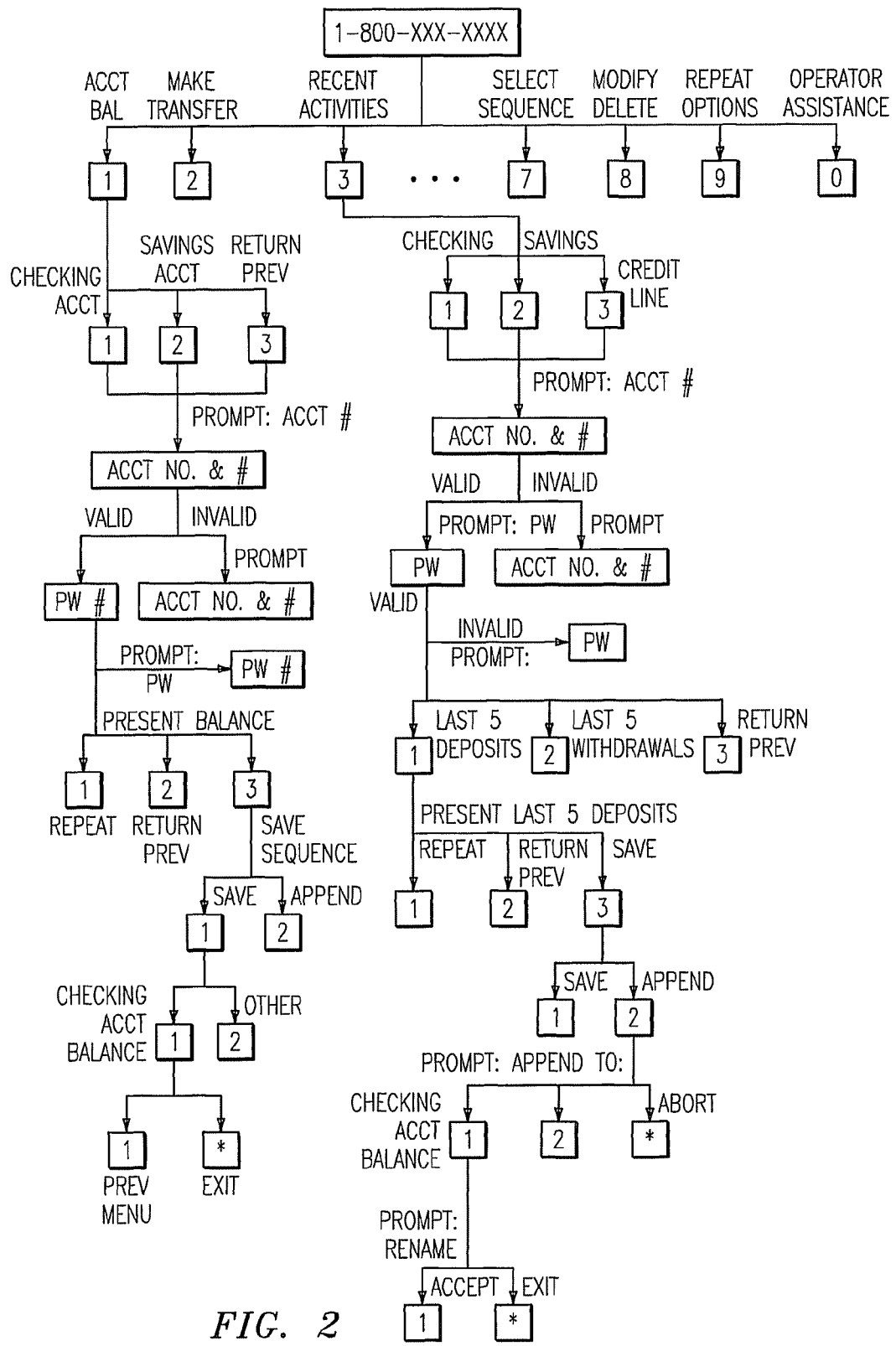
FIG. 2 is a diagram depicting a sample call flow including two input sequences in accordance with exemplary embodiments.

Turning now to FIG. 2, a diagram depicting a sample call flow including two input sequences in accordance with exemplary embodiments will now be described. For purposes of illustration, the call flow illustrated in FIG. 2 relates to a banking institution. However, it will be understood by those skilled in the art that a variety of applications may benefit from the custom call flow services. For example, electronic commerce, caller identification and routing, airline ticketing and related transactions, etc.

The call flow depicted in FIG. 2 provides several menu options available to a customer upon placing a call that is forwarded to the host system 104 (e.g., via 800-xxx-xxxx). The options provided include obtaining an account balance ("1"), making a transfer ("2"), recent account activities ("3"), selecting a custom sequence ("7"), modifying/deleting a custom sequence ("8"), repeating presentation of the aforementioned options ("9"), and operator assistance ("0"). It will be understood that these options are provided for illustrative purposes and are not to be construed as limiting in scope. The numbers presented in FIG. 2 represent sample inputs (input keys) associated with each menu option via the IVR system 108 and custom call flow application 110.

As shown in FIG. 2, the caller has selected account balance ("1"). Thereafter, the caller selects option 1 (checking account), followed by entering an account number ending with the 'pound' key. If the account number is determined to be valid, the caller is next prompted to enter a password. If both are valid, the IVR system 108 retrieves the checking account balance associated with the account number and presents it to the caller via, e.g., a TTS engine. According to exemplary embodiments, the call flow continues with options for repeating the balance (option 1), returning to a previous menu (option 2), or saving the call flow sequence of inputs entered thus far (option 3). Again, it will be appreciated that the options may be modified in any manner. In addition, it will be understood that the ordering of the sequence of options presented may be modified in order to realize the advantages of the exemplary embodiments. For example, the account number prompt may be presented immediately after the caller accesses the IVR system 108 (e.g., after a communication session is established in response to entering the 800 number).

As shown in FIG. 2, a second call sequence for retrieving recent activities (via option 3) is shown. The options selected (and resulting input sequence) include 3, 2, account number, *, password, *, 1, 3, 2, 1, and 1. As shown in this second call sequence, the caller has opted to append, or integrate, the second call sequence with the first call sequence. This feature is described further in FIG. 3.

As indicated above, the custom call flow services enable the caller to create a custom sequence from the sequence of inputs entered in the call flow. Using the above call flow example, the sequence of inputs includes 1, 1, account number, #, PW, #, and 3. According to exemplary embodiments, the custom call flow application 110 distinguishes between input types in the call flow sequence. Input types may include data flow inputs, security inputs, administrative inputs, and termination inputs. Data flow inputs may specify a particular call flow associated with data elements subject to query and retrieval by a caller. The particular call flow is an ordered sequence of inputs associated with a defined output. The defined output of the aforementioned sequence of inputs described above relates to a current checking account balance of the caller. Thus, the data flow inputs are directly related to the type of output desired by the caller.

The security inputs may represent any type of authentication information used to identify the caller, an account, or information element that is subject to restricted access. For example, an authentication may be a user identification and password, an account number and PIN, etc.

The termination inputs may represent an exit path directing the caller away from the call flow or sequence of inputs. The exit path may end the call entirely or a portion of the call flow (e.g., exit selection to return to a previous menu).

The administrative inputs may reflect those inputs that are not otherwise associated with data path inputs, security inputs, and termination inputs. In addition, the administrative inputs facilitate traversal of a communication path with respect to the call flow. The administrative inputs enable the user to move back and forth through the call flow and interactive options set forth in the IVR system 108. For example, administrative inputs may include: repeating a menu option, returning to a previous menu, saving the call flow, saving a portion of the call flow, requesting operator assistance, and aborting a call flow without terminating a call, to name a few.

The custom call flow application 110 utilizes the sequence of inputs to produce a custom call sequence as will be described further in FIG. 3.

Figure 3:
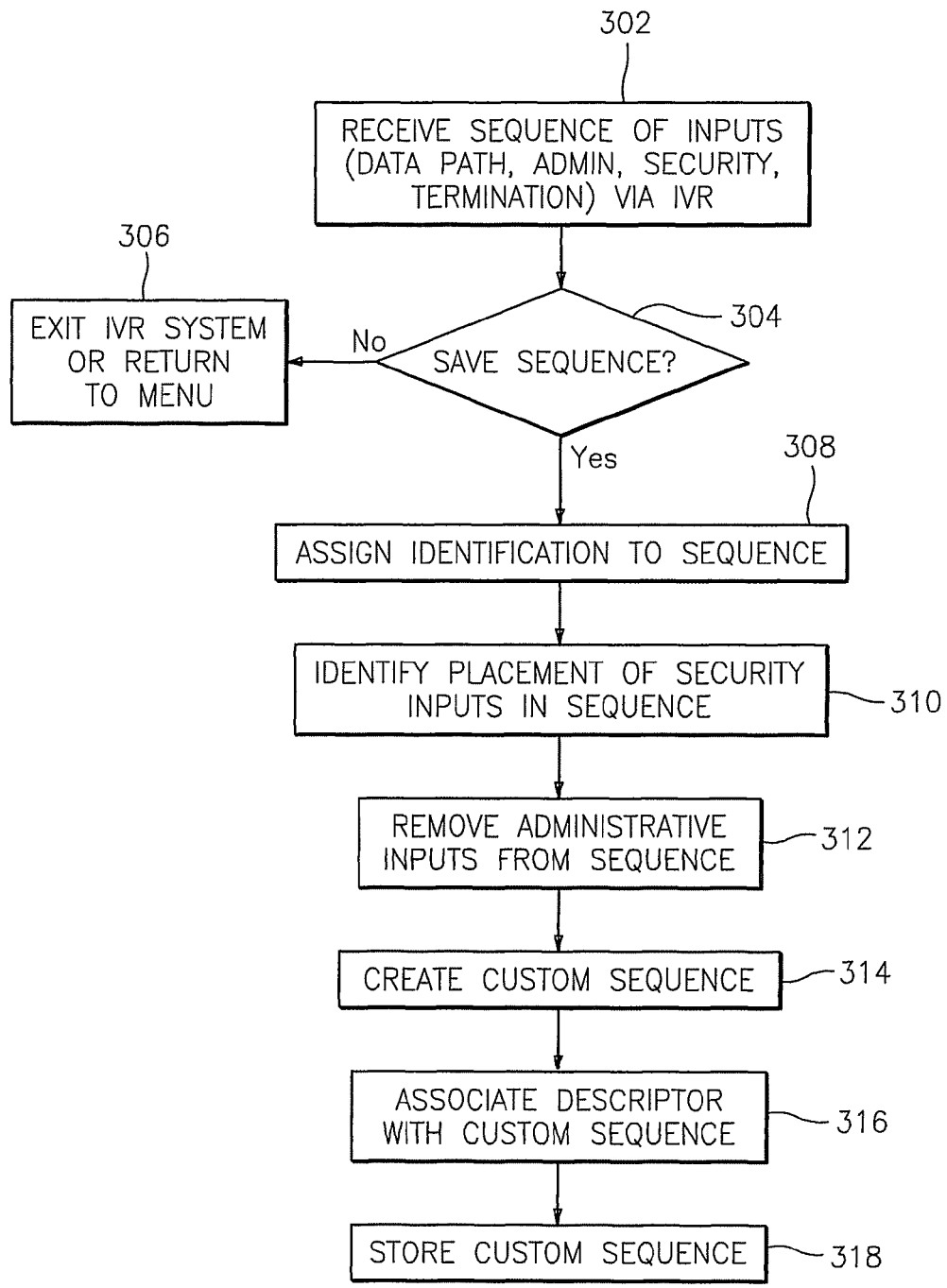
FIG. 3 is a flow diagram describing a process for implementing the custom, interactive call flow services in accordance with exemplary embodiments.

Turning now to FIG. 3, a flow diagram describing a process for implementing the custom call flow services in accordance with exemplary embodiments will now be described.

At step 302, the custom call flow application 110 receives a sequence of inputs including data path inputs, security inputs, administrative inputs, and a termination input. At step 304, is the custom call flow application 110 determines whether the caller would like to save the sequence (e.g., menu option: PRESENT LAST 5 DEPOSITS—SAVE ("3") shown in FIG. 2).

If not, the caller exits the IVR system 108 or returns to a previous menu (e.g., via menu option: PRESENT LAST 5 DEPOSITS—RETURN PREV ("2") shown in FIG. 2) at step 306. Otherwise an identification (e.g., account of caller) is assigned to the sequence by the custom call flow application 110 at step 308. The identification specifies an account associated with a caller and the security inputs, and/or the caller.

At step 310, a placement of the security inputs is identified in the sequence by the custom call flow application 110. For example, in the sequence above: 1, 1, account number, #, PW, #, and 3, the account number is the third input and the password is the fifth input. At step 312, the custom call flow application 110 removes the administrative inputs and security inputs from the sequence of inputs and maintains a placeholder for the security inputs. The placeholder may be used as a guide for prompting the caller to enter security data (e.g., user identification and password) at a particular location in the custom sequence. In exemplary embodiments, the security data is re-entered by the caller via the custom sequence in contrast to saving the security inputs as part of the custom sequence, in order to safeguard the caller from unauthorized access to protected information. However, in alternative exemplary embodiments, the security inputs may be stored as part of the custom sequence.

At step 314, the custom call flow application 110 creates a custom sequence using the ordered set of data path inputs, placeholder, and termination input. At step 316, a descriptor is associated with the custom sequence by the custom call flow application 110. The descriptor provides a summarized description of the custom sequence. Using the above call flow example (i.e., the first call flow sequence of FIG. 2), the descriptor may be CHECKING ACCOUNT BALANCE, which is shown generally in FIG. 2. At step 316, the descriptor is associated with the custom sequence and stored in storage device 112 at step 318 as a custom call flow by the custom call flow application 110.

Once a custom call flow has been defined by a user, it may be invoked using various techniques. For example, if the IVR system employed is associated with a bank, a caller may enter the telephone number of the bank, and be presented with descriptors associated with custom call flows specific to that caller (e.g., using the caller's telephone number as a key to the custom call flows that correspond to the particular caller). The caller may then select the appropriate descriptor for invoking the related custom call flow. In doing so, the caller bypasses extraneous IVR data and prompts typically associated with manual IVR navigation techniques.

It will be understood that delays (e.g., in entering data in response to prompts) may be handled quite differently from one IVR system to another. For example, one IVR system may forward the call to an operator if it times out awaiting user input to a particular prompt, while another IVR system might revert to the "home menu" in this situation. Additional code may be provided in the custom call flow application 110 for enabling the IVR system to adapt to these individual differences on a custom (i.e., per IVR system) basis, e.g., by alerting the calling user to the time out condition so that he/she can respond appropriately.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for implementing a custom call flow, comprising:
    receiving a sequence of user inputs provided as part of an interactive call between a caller requesting a service and a service provider that provides the service, the sequence of user inputs including data path inputs, security inputs, administrative inputs, and a termination input;
    identifying placement of the security inputs in the sequence;
    removing the administrative inputs and the security inputs from the sequence;
    creating a custom sequence including the data path inputs, a placeholder representing the placement of the security inputs, and the termination input; and
    invoking the custom call flow from the custom sequence received from the caller each time the caller initiates a request for the service;
    wherein the custom sequence uses the placeholder to prompt the caller to enter the security inputs at a location specified in the placeholder of the custom sequence.

2. The method of claim 1, further comprising:
    assigning an account identifier to the custom sequence;
    associating a descriptor with the custom sequence; and
    storing the account identifier and descriptor with the custom sequence;
    wherein the account identifier and the descriptor are used to retrieve and implement the custom sequence upon receiving the request.

3. The method of claim 2, wherein the account identifier specifies an account associated with the caller and the security inputs, and the descriptor includes a summarized description of the custom sequence.

4. The method of claim 1, wherein the data path inputs specify a call flow associated with data elements subject to query and retrieval by the caller.

5. The method of claim 1, wherein the security inputs include authentication data provided by the caller.

6. The method of claim 1, wherein the administrative inputs are entered by the caller in facilitating movement of a call flow, the administrative inputs unrelated to the data path inputs;
    wherein the administrative inputs include:
    repeating a menu option;
    returning to a previous menu;
    saving the call flow;
    saving a portion of the call flow;
    requesting operator assistance; and
    aborting a call flow without terminating a call.

7. The method of claim 1, further comprising:
    aggregating a second sequence of user inputs with the custom sequence, the second sequence of user inputs including data path inputs, administrative inputs, another termination input, and duplicate entry of the security inputs;
    identifying placement of the duplicate entry of the security inputs in the second sequence of user inputs;
    removing the administrative inputs and the security inputs from the second sequence of user inputs;
    removing the other termination input from the custom sequence; and
    creating another custom sequence including the data path inputs from the custom sequence and the second sequence of user inputs, a placeholder representing the placement of the security inputs in the custom sequence, and the other termination input.

8. A system for implementing a custom call flow, comprising:
    a host system in communication with an interactive voice response system; and
    a custom call flow application executing on the host system, the custom call flow application implementing a method, comprising:
    receiving a sequence of user inputs provided as part of an interactive call between a caller requesting a service and a service provider that provides the service, the sequence of user inputs including data path inputs, security inputs, administrative inputs, and a termination input, the sequence of user inputs unique to the caller;
    identifying placement of the security inputs in the sequence;
    removing the administrative inputs and the security inputs from the sequence; and
    creating a custom sequence including the data path inputs, a placeholder representing the placement of the security inputs, and the termination input; and
    invoking the custom call flow from the custom sequence received from the caller each time the caller user initiates a request for the service;
    wherein the custom sequence uses the placeholder to prompt the caller to enter the security inputs at a location specified in the placeholder of the custom sequence.

9. The system of claim 8, wherein the call flow application further performs:
    assigning an account identifier to the custom sequence;
    associating a descriptor with the custom sequence; and storing the account identifier and descriptor with the custom sequence;

wherein the account identifier and the descriptor are used to retrieve and implement the custom sequence upon receiving the request.

10. The system of claim 9, wherein the account identifier specifies an account associated with the caller and the security inputs, and the descriptor includes a summarized description of the custom sequence.

11. The system of claim 8, wherein the data path inputs specify a call flow associated with data elements subject to query and retrieval by the caller, the security inputs include authentication data provided by the caller.

12. The system of claim 8, wherein the administrative inputs are entered by the caller in facilitating movement of a call flow, the administrative inputs unrelated to the data path inputs;

wherein the administrative inputs include:
repeating a menu option;
returning to a previous menu;
saving the call flow;
saving a portion of the call flow;
requesting operator assistance; and
aborting a call flow without terminating a call.

13. The system of claim 8, wherein the call flow application further performs:

aggregating a second sequence of user inputs with the custom sequence, the second sequence of user inputs including data path inputs, administrative inputs, another termination input, and duplicate entry of the security inputs;

identifying placement of the duplicate entry of the security inputs in the second sequence of user inputs;

removing the administrative inputs and the duplicate entry of the security inputs from the second sequence of user inputs;

removing the other termination input from the custom sequence; and creating another custom sequence including the data path inputs from the custom sequence and the second sequence of user inputs, a placeholder representing the placement of the security inputs in the custom sequence, and the other termination input.

14. A computer program product for implementing a custom call flow, the computer program product comprising a non-transitory storage medium having instructions embodied thereon, which when executed by a computer cause the computer to implement a method, comprising:

receiving a sequence of user inputs provided as part of an interactive call between a caller requesting a service and a service provider that provides the service, the sequence of user inputs including data path inputs, security inputs, administrative inputs, and a termination input, the sequence of user inputs unique to the caller;

identifying placement of the security inputs in the sequence;

removing the administrative inputs and the security inputs from the sequence;

creating a custom sequence including the data path inputs, a placeholder representing the placement of the security inputs, and the termination input; and invoking the custom call flow from the custom sequence received from the caller each time the caller initiates a request for the service;

wherein the custom sequence uses the placeholder to prompt the caller to enter the security inputs at a location specified in the placeholder of the custom sequence.

15. The computer program product of claim 14, further comprising instructions for performing:

assigning an account identifier to the custom sequence;
associating a descriptor with the custom sequence; and
storing the account identifier and descriptor with the custom sequence;

wherein the account identifier and the descriptor are used to retrieve and implement the custom sequence upon receiving the request.

16. The computer program product of claim 15, wherein the account identifier specifies an account associated with the caller and the security inputs, and the descriptor includes a summarized description of the custom sequence.

17. The computer program product of claim 14, wherein the data path inputs specify a call flow associated with data elements subject to query and retrieval by the caller.

18. The computer program product of claim 14, wherein the security inputs include authentication data provided by the caller.

19. The computer program product of claim 14, wherein the administrative inputs are entered by the caller in facilitating movement of a call flow, the administrative inputs unrelated to the data path inputs;

wherein the administrative inputs include:
repeating a menu option;
returning to a previous menu;
saving the call flow;
saving a portion of the call flow;
requesting operator assistance; and
aborting a call flow without terminating a call.

20. The computer program product of claim 14, further comprising instructions for performing:

aggregating a second sequence of user inputs with the custom sequence, the second sequence of user inputs including data path inputs, administrative inputs, another termination input, and duplicate entry of the security inputs;

identifying placement of the duplicate entry of the security inputs in the second sequence of user inputs;

removing the administrative inputs and the duplicate entry of the security inputs from the second sequence of user inputs;

removing the other termination input from the custom sequence; and creating another custom sequence including the data path inputs from the custom sequence and the second sequence of user inputs, a placeholder representing the placement of the security inputs in the custom sequence, and the other termination input.

* * * * *